United States Patent [19]

Sullivan et al.

[11] Patent Number: 5,038,640
[45] Date of Patent: Aug. 13, 1991

[54] TITANIUM CARBIDE MODIFIED HARDFACING FOR USE ON BEARING SURFACES OF EARTH BORING BITS

[75] Inventors: Eric C. Sullivan, Houston; Louis H. Barnard, Pasadena, both of Tex.

[73] Assignee: Hughes Tool Company, Houston, Tex.

[21] Appl. No.: 477,239

[22] Filed: Feb. 8, 1990

[51] Int. Cl.⁵ .......................... B21K 5/02; C22C 29/10
[52] U.S. Cl. .................................. 76/108.2; 384/625; 29/898.12; 29/898.13; 29/898.14
[58] Field of Search ................. 76/101.1, 108.1, 108.2, 76/DIG. 11; 384/625, 91, 92, 276, 280; 29/898, 898.04, 898.047, 898.059, 898.12, 898.13, 898.14

Primary Examiner—Roscoe V. Parker
Attorney, Agent, or Firm—Charles D. Gunter, Jr.

[57] ABSTRACT

An improved hardfacing composition and method are shown for use in manufacturing an earth boring bit. The hardfacing composition is formed by combining titanium carbide with a hard-metal alloy of the iron or cobalt family. The hardfacing composition is then applied to the friction bearing surface of the rock bit.

8 Claims, 1 Drawing Sheet

TITANIUM CARBIDE MODIFIED HARDFACING FOR USE ON BEARING SURFACES OF EARTH BORING BITS

BACKGROUND OF THE INVENTION

1. Field of the Invention

The present invention relates generally to earth boring bits of the type used to drill oil and gas wells and particularly to improvements in the bearing regions of rolling cutter bits achieved by applying titanium carbide modified hardfacing compositions to the friction bearing surfaces thereof.

2. Description of the Prior Art

As a bit bores through the earth, it experiences increasingly higher pressures and temperatures, while the abrasives that surround the bit create extremely destructive conditions. In order to improve bit life expectancy, continuing effort is directed toward improving the bearing surfaces of the rolling cutter bit.

At the present time, the bearing surfaces of rotatable cutters in earth boring drill bits are commonly carburized, hardened and tempered to increase their wear resistance. Gas carburizing is a known technique which has been used in the past to produce a uniform case on the head section bearings of earth boring drill bits. Pack carburizing is another technique used at the present time to treat the bearing areas of earth boring drill bits. A particulate carburizing compound is packed in a container which surrounds the drill bit bearing area which is to be treated. Other surface treatments of the bearing surfaces which have been used in the past include boronizing and combinations of carburizing and boronizing.

Although surface treatments of the above type have prolonged the useful life of rolling cutter rock bits, each method has associated disadvantages. For instance, the boronized "case" was typically very hard and thin. As a result, the boronized surfaces could not be ground after heat treatment to achieve dimensional accuracy. Carburized bearing surfaces tend to wear fairly quickly, although they can be ground after heat treatment.

Another prior art technique for improving the wear resistance of the bearing surfaces of rolling cutter rock bits was the application of "hard-metal alloy" hardfacing materials. In such processes, a hardfacing such as an iron-based alloy was supplied as a cast rod which was applied to the bearing surface by welding with an oxyactylene torch. These hardfacings allowed precision grinding to achieve dimensional accuracy but did not provide the improved wear resistance which was desired. Because of the disadvantages associated with surface treatment of the friction bearing surfaces, attention is again being directed to developing an improved hardfacing for the friction bearing surface of a rotary rock bit.

The present invention has as its object to provide such an improved hardfacing composition. Another object of the invention is to provide a method for manufacturing an earth boring bit having friction bearing surfaces with improved abrasion, adhesion and fatigue resistance using the hardfacing composition of the invention.

SUMMARY OF THE INVENTION

In the method of manufacturing an earth boring bit of the type having a rotatable cutter secured to a bearing shaft on a head of the bit and at least one friction bearing surface, a hardfacing composition is first formed by combining titanium carbide with a hard metal alloy. The hardfacing composition is then applied to the friction bearing surface of the earth boring bit.

The hard-metal alloy can be either an iron-based hard-metal alloy or a cobalt-based hard-metal alloy. Most preferably, the iron-based hard-metal alloy consists essentially of the following composition, excluding impurities:

from about 30 to 35% by weight chromium,
approximately 10% by weight nickel,
approximately 12% by weight cobalt,
approximately 5% by weight silicon,
from about 1 to 3% by weight carbon, and
the balance being iron, all weight percents being based on the total weight of the hard-metal alloy.

The hardfacing composition is formed by combining about 5 to 15% by volume titanium carbide with the hard-metal alloy. Preferably, the iron-based, hard-metal alloy is supplied as a powder mixture. Powdered titanium carbide is then combined with the hard-metal alloy powders and the powder blend is applied to the bearing surface of the rock bit by gas plasma arc welding.

A preferred cobalt-based hard-metal alloy consists essentially of the following composition, excluding impurities:

from about 1 to 3.5% by weight carbon,
up to about 5% nickel,
from about 24 to 30% by weight chromium,
from about 4 to 20% by weight tungsten, and
the balance being cobalt, all weight percents being based on the total weight of the hard metal alloy.

The hardfacing composition is formed by combining about 5 to 15% by volume titanium carbide with the hard-metal alloy.

Additional objects, features and advantages will be apparent in the written description which follows

DETAILED DESCRIPTION OF THE INVENTION

Figure 1:
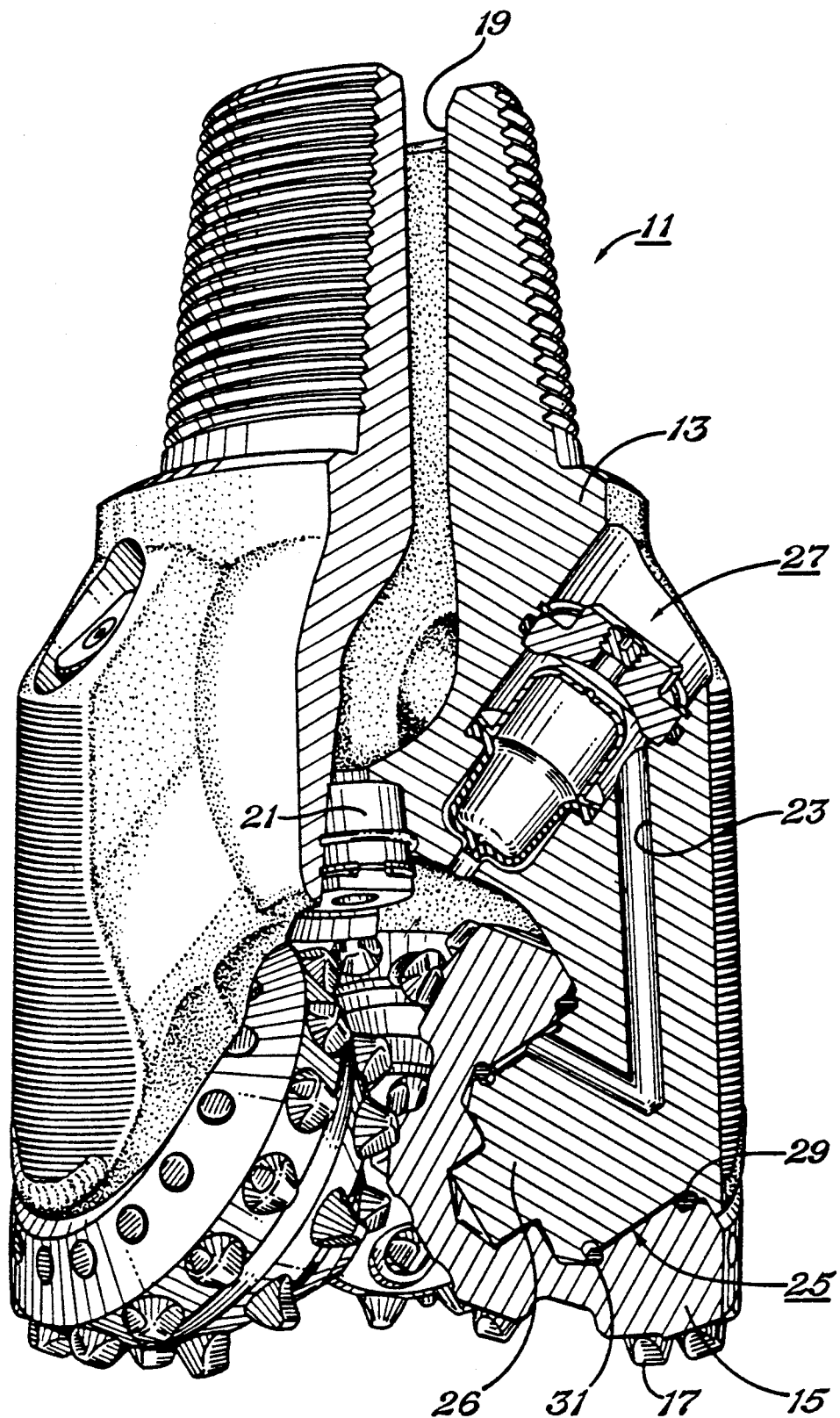
FIG. 1 is a perspective view, partially in longitudinal section, of a earth boring bit of the rolling cutter type showing the friction bearing surfaces which are the subject of the hardfacing method of the present invention.

The numeral 11 in the drawing designates an earth boring bit which consists of three identical head sections 13, each of which supports a rotatable cutter 15 having a plurality of earth disintegrating teeth 17, here depicted as being inserts of sintered tungsten carbide.

Thus, the three head sections 13 together form a head or body having a hollow interior 19 which terminates at the lower end in usually three passages, each containing a nozzle 21 used to direct drilling fluid or mud against the borehole bottom (not shown).

A lubricant passage 23 in each head section extends between the bearing means 25 of a cantilevered bearing shaft 26 and a lubricant pressure compensator and relief means 27.

Lubricant is maintained in the bearing means 27 by a seal means 29, here an O-ring. Each rotatable cutter 15 is retained to the bearing shaft 26 by suitable means such as a snap ring 31. The friction bearing surface regions of the shaft 26 have been darkened for emphasis, it being understood that the bearing surfaces also comprise the mating surfaces on the interior of the rotatable cutter 15. These surfaces will be understood by those skilled in the art to include generally the journals, thrust faces, retaining ring grooves and pilot pins.

The bits manufactured in accordance with the present invention utilize an improved hardfacing composition which is formed by adding titanium carbide within a desired range to a selected, "hard-metal alloy" type hardfacing. By hard-metal alloy hardfacing is meant a commercially available wear resistant alloy which in this case is selected from the iron-based or cobalt-based families. A suitable hard-metal alloy of the iron-based family which is suitable for the purpose of the present invention is commercially available under the trademark "TRISTELLE" from Cabot Stellite Division, Santa Fe Springs, California. These alloys are conveniently supplied in powder form making them well adapted for application by plasma transfer arc methods. Three preferred compositions are shown in Table I.

TABLE I

| TRISTELLE Hard Metal Alloys | | | |
|---|---|---|---|
| | TS-1 Wt. % | TS-2 Wt. % | TS-3 Wt. % |
| Cr | 30 | 35 | 35 |
| Ni | 10 | 10 | 10 |
| Co | 12 | 12 | 12 |
| Si | 5 | 5 | 5 |
| C | 1 | 2 | 3 |
| Fe | Bal. | Bal. | Bal. |

Hard-metal alloys of the cobalt family useful in the practice of the present invention are commercially available under the trademark "STELLITE" from a number of sources including Stoody Deloro Stellite, Inc., Industry, California. Two preferred compositions are shown in Table II.

TABLE II

| STELLITE Hard Metal Alloys | | |
|---|---|---|
| | Stellite 1 Wt. % | Stellite 6 Wt. % |
| C | 2.5 | 1.1 |
| Cr | 30 | 28 |
| W | 12 | 4 |
| Co | Bal. | Bal. |

Hard-metal alloys of the above type will be familiar to those skilled in the arts of the surfacing and welding consumables.

In order to form the hardfacing compositions of the invention, the hard-metal alloys have added thereto about 5 to 15 volume percent titanium carbide, preferably supplied as a powder. Titanium carbide is commercially available from a number of sources and is useful in particle sizes ranging from about minus 325 mesh, 10 micron to plus 325 mesh, minus 200 mesh, 10 micron.

A preferred hardfacing composition based on a hard-metal alloy of the iron-based family comprises a hard-metal alloy consisting essentially of the following composition, excluding impurities:
  from about 30 to 35% by weight chromium,
  approximately 10% by weight nickel,
  approximately 12% by weight cobalt,
  approximately 5% by weight silicon,
  from about 1 to 3% by weight carbon, and
  the balance being iron, all weight percents being based on the total weight of the hard-metal alloy;
the hardfacing composition having combined therewith about 5 to 15% by volume titanium carbide.

A preferred hardfacing composition based on a hard-metal alloy of the cobalt-based family comprises a hard-metal alloy consisting essentially of the following composition, excluding impurities:
  from about 24 to 28% by weight chromium,
  up to about 5% by weight nickel,
  from about 4 to 20% by weight tungsten,
  from about 1 to 3.5% by weight carbon, and
  the balance being cobalt, all weight percents being based on the total weight of the hard-metal alloy;
having combined therewith about 5 to 15% by volume titanium carbide.

The hard-metal alloy is preferably provided as a mixture of powders and the titanium carbide is preferably combined therewith by blending as a powder. The powder blend can then be applied to the selected metal surface by any convenient technique. Most preferably, the powder blend is applied by powder feed, gas plasma arc welding. Gas plasma arc welding is a technique familiar to those in the bit manufacturing industries and provides a convenient method for applying a hardfacing which is supplied as a blend of powders.

We have found that with the iron family of hard-metal alloys described above that chromium is available after application, in solid solution. Accordingly, the bearing surfaces so treated can be advantageously carburized in order to react with a portion of the chromium in solid solution and improve wear performance further. Gas and pack carburizing techniques are known in the art and are described, for instance, in U.S. Pat. No. 4,643,051, "Pack Carburizing Process For Earth Boring Drill Bits" issued Feb. 17, 1987, and assigned to the assignee of the present invention.

In order to test the effectiveness of the hardfacings of the invention, laboratory bearing parts were loaded at 6,000 lbs. and rotated at 168 RPM at temperatures of 200°-250° F. The laboratory invention parts demonstrated low wear characteristics when compared to similar parts with standard treatments.

The effectiveness of the hardfacings of the invention was further tested by manufacturing six $7\frac{7}{8}''$ ATJ22S bits in which the journal bearing surface of the cones was brush-plated with silver (0.0012"+/−0.0002") over a carburized quenched and tempered surface. The journal bearing surface of the heads was hardfaced with a composition made up of a blend of Stellite 6 powder and titanium carbide. The diametral bearing clearance was 0.0056"+/−0.0024. These bits, as predicted by the laboratory tests, demonstrated low wear characteristics when compared with bits of standard manufacture.

An invention has been provided with several advantages. The improved hardfacing compositions of the invention provide improved abrasion, adhesion and fatigue resistance in rotary earth boring bits. The bearing surfaces can be precision ground after application to ensure dimensional accuracy. The wear resistance of the resulting bearing structure is greatly improved over the prior art technique of carburizing and then boronizing the bearing pin.

While the invention has been shown in only two of its forms, it is not thus limited but is susceptible to various changes and modifications without departing from the spirit thereof.

I claim:

1. A method of manufacturing an earth boring bit of the type having a rotatable cutter secured to a bearing shaft on a head of the bit and at least one friction bearing surface, the improvement comprising:

forming a hardfacing composition by combining particulate titanium carbide with a hard metal alloy, the particulate titanium carbide having a particle size less than about 10 micron;

applying the hardfacing composition to the friction bearing surface of a selected one of the bearing shaft and rotatable cutter of the earth boring bit.

2. The method of claim 1, wherein the hard metal alloy is an iron-based hard metal alloy.

3. The method of claim 1, wherein the hard metal alloy is a cobalt-based hard metal alloy.

4. A method of manufacturing an earth boring bit of the type having a rotatable cutter secured to a bearing shaft on a head of the bit and at least one friction bearing surface, the improvement comprising:

selecting a hard metal alloy consisting essentially of the following composition, excluding impurities:
from about 30 to 35% by weight chromium,
approximately 10% by weight nickel,
approximately 12% by weight cobalt,
approximately 5% by weight silicon,
from about 1 to 3% by weight of carbon, and
the balance being iron, all weight percents being based on the total weight of the hard metal alloy;

forming a hardfacing composition by combining about 5 to 15% by volume titanium carbide with the hard metal alloy; and applying the hardfacing composition to the friction bearing surface of the earth boring bit.

5. The method of claim 4, further comprising the steps of:

carburizing the previously hardfaced friction bearing surface of the earth boring bit.

6. A method of manufacturing an earth boring bit of the type having a rotatable cutter secured to a bearing shaft on a head of the bit and at least one friction bearing surface, the improvement comprising:

selecting a hard metal alloy consisting essentially of the following composition, excluding impurities:
from about 1 to 2.5% by weight carbon,
from about 28 to 30% by weight chromium,
from about 4 to 12% by weight tungsten, and
the balance being cobalt, all weight percents being based on the total weight of the hard metal alloy;

forming a hardfacing composition by combining about 5 to 15% by volume titanium carbide with the hard metal alloy; and applying the hardfacing composition to the friction bearing surface of the earth boring bit.

7. A method of manufacturing an earth boring bit of the type having a rotatable cutter secured to a bearing shaft on a head of the bit and at least one friction bearing surface, the improvement comprising:

selecting a hard metal alloy powder mixture consisting essentially of the following composition, excluding impurities:
approximately 35% by weight chromium,
approximately 10% by weight nickel,
approximately 12% by weight cobalt,
approximately 5% by weight silicon,
approximately 2% by weight of carbon, and
the balance being iron, all weight percents being based on the total weight of the hard metal alloy powder;

forming a powdered hardfacing composition by blending about 5 to 15% by volume powdered titanium carbide with the hard metal alloy powder mixture; and applying the powdered hardfacing composition to the friction bearing surface of the earth boring bit.

8. The method of claim 7 further comprising the step of:

carburizing the previously hardfaced friction bearing surface.

* * * * *